US006483964B1

(12) United States Patent
Beguin et al.

(10) Patent No.: US 6,483,964 B1
(45) Date of Patent: Nov. 19, 2002

(54) METHOD OF FABRICATING AN OPTICAL COMPONENT

(75) Inventors: Alain M J Beguin, Vulaines sur Seine (FR); Philippe Lehuede, Yerres (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/120,581

(22) Filed: Jul. 22, 1998

(30) Foreign Application Priority Data

Jul. 23, 1997 (FR) .............................................. 97 09356

(51) Int. Cl.$^7$ ........................... G02B 6/34; C03B 37/022
(52) U.S. Cl. ........................................ 385/37; 65/386
(58) Field of Search ......................... 65/386, 385, 400, 65/395, 413, 414; 385/122, 123, 126, 37

(56) References Cited

U.S. PATENT DOCUMENTS

| 4,153,330 A | | 5/1979 | Tomlinson, III |
| 4,656,636 A | | 4/1987 | Amann et al. |
| 4,715,027 A | | 12/1987 | Mahapatra et al. |
| 4,747,649 A | | 5/1988 | Heinen et al. |
| 4,773,063 A | | 9/1988 | Hunsperger et al. |
| 4,786,133 A | | 11/1988 | Gidon et al. |
| 4,851,025 A | * | 7/1989 | Siefert et al. ................... 65/413 |
| 4,971,415 A | | 11/1990 | Hara et al. |
| 5,106,211 A | | 4/1992 | Chiang et al. ............... 385/122 |
| 5,195,161 A | | 3/1993 | Adar et al. |
| 5,228,103 A | | 7/1993 | Chen et al. |
| 5,377,288 A | | 12/1994 | Kashyap et al. ............... 385/37 |
| 5,480,764 A | | 1/1996 | Gal et al. |
| 5,502,787 A | * | 3/1996 | Capasso et al. ............. 385/123 |
| 5,581,639 A | | 12/1996 | Davies et al. |
| 5,600,743 A | | 2/1997 | Hillmer |
| 5,608,826 A | | 3/1997 | Boord et al. |
| 5,612,171 A | | 3/1997 | Bhagavatula ............... 430/321 |
| 5,636,300 A | | 6/1997 | Keck et al. ................... 385/24 |
| 5,802,236 A | | 9/1998 | DiGiovanni et al. ........ 385/566 |

FOREIGN PATENT DOCUMENTS

| EP | 0 464 869 A1 | 12/1985 |
| EP | 0 250 824 | 7/1988 |
| EP | 0 393 372 | 3/1990 |
| FR | 2 635 198 | 8/1988 |

OTHER PUBLICATIONS

Derwent Patent Abstract DE4000445, Jan. 9, 1990.
Derwent Patent Abstract DE19526734, Jan. 23, 1997.
Derwent Patent Abstract EP–753769, Jan. 15, 1997.
Derwent Patent Abstract EP–725287, Aug. 7, 1996.
Derwent Patent Abstract DE4446101, Jul. 4, 1996.
Derwent Patent Abstract DE4445835, Jun. 27, 1996.

(List continued on next page.)

*Primary Examiner*—Mark A. Robinson
*Assistant Examiner*—Jennifer Winstedt
(74) *Attorney, Agent, or Firm*—Edward F. Murphy, I; James V. Suggs

(57) ABSTRACT

An optical component comprising one or more optical elements (35') aligned with the end(s) of one or more waveguides (25') is fabricated by a process in which, first of all, a doped silica core layer (20) is deposited on a substrate (10) (or on a buffer layer on the substrate), and subsequently a partial overclad layer (30A) typically 1–5 μm thick is deposited on the core layer. The partial overclad layer and core layer are patterned and etched so as simultaneously to define the optical element(s) and the waveguide core(s). Afterwards, the overclad is completed by depositing a further overclad layer (30B). In the case of application of this fabrication method to a grating-based NBWDM device, the metallisation of the grating can precede or follow the deposition of the second overclad portion (30B). In either case, low-temperature deposition processes are required for deposition of this second overclad portion.

17 Claims, 7 Drawing Sheets

OTHER PUBLICATIONS

Derwent Patent Abstract DE4445566, Jun. 5, 1996.
Derwent Patent Abstract EP–724170, Jul. 31, 1996.
Derwent Patent Abstract DE4434891, Apr. 4, 1996.
Derwent Patent Abstract GB2281786, Mar. 15, 1995.
Derwent Patent Abstract EP–599394, Jun. 1, 1994.
Derwent Patent Abstract J63205613, Aug. 25, 1988.
Derwent Patent Abtract J92077883, Oct. 24, 1983.
Dialog Web Patent Abstract, FR 2635198 A, Aug. 3, 1988.
Dialog Web Patent Abstract, EP 464869 A, Dec. 17, 1985.
Dialog Web Patent Abstract, EP 393372 A, Mar. 21, 1990.

* cited by examiner

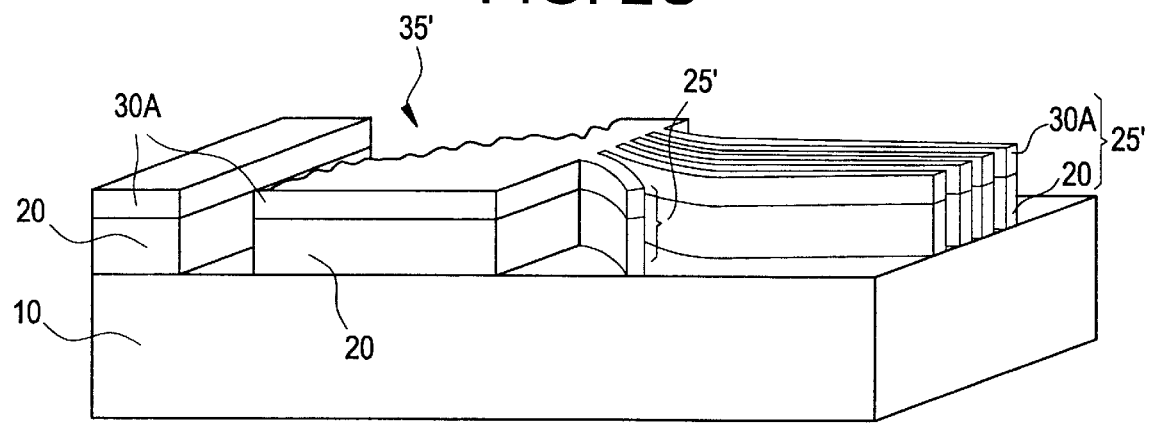
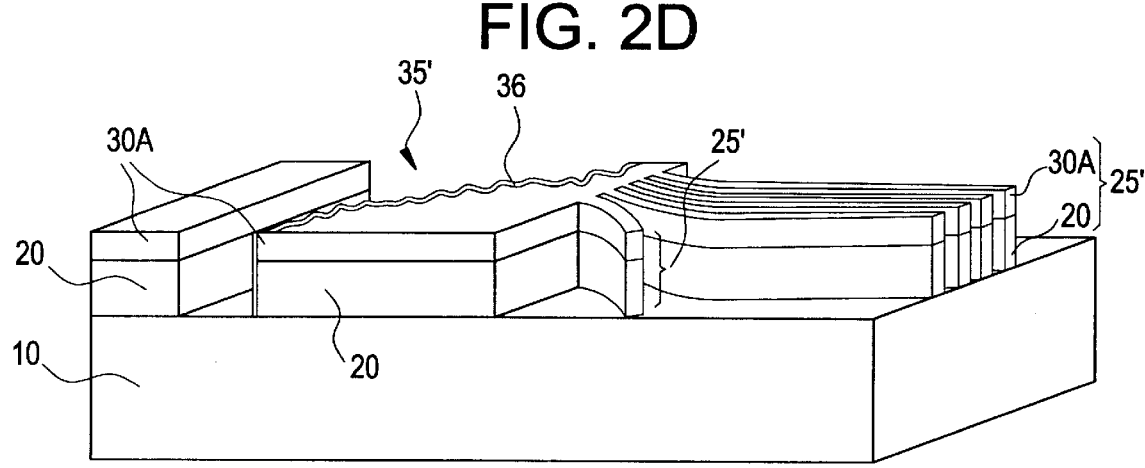
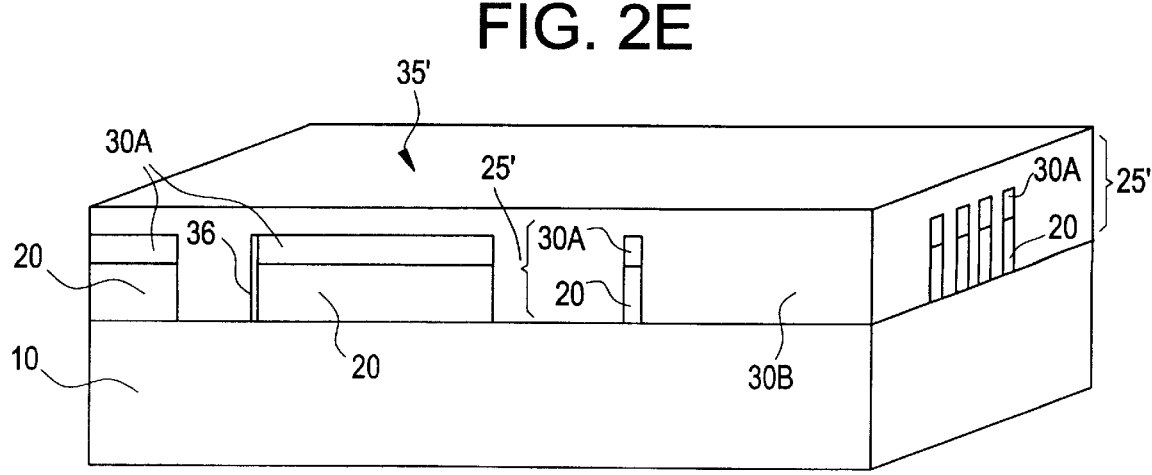

METHOD OF FABRICATING AN OPTICAL COMPONENT

This application claims priority to French Patent Application No. 97 09356 filed on Jul. 23, 1997, which is herein incorporated by reference.

FIELD OF THE INVENTION

The present invention relates to the field of manufacture of optical components and, in particular, to the fabrication of integrated (or planar) optical components. More especially, the invention relates to the fabrication of optical components in which one or more waveguides are formed in association with one or more other optical elements aligned with the end(s) of the waveguide(s).

BACKGROUND OF THE INVENTION

In the field of integrated optics it is often necessary to make a component in which one or more optical elements is aligned with the end(s) of one or more waveguides. This is the case, for example, when manufacturing a wavelength division multiplexer. Typically, in a first stage of the fabrication process, the successive layers making up the waveguides are deposited on a substrate and patterns are traced therein. Afterwards, when the waveguide structure is complete (core layer and overclad layer, perhaps with a buffer layer between the substrate and the core layer), the associated optical element is formed, aligned as desired with the ends of the waveguides, by patterning and etching the completed waveguide structure. This second stage in the fabrication process involves performing a photolithography and etching process on a thick layered structure, for example 20–30 $\mu$m thick, and leads to numerous problems.

The problems inherent in the conventional fabrication process will be explained in greater detail by describing a process for fabricating a diffraction-grating-based, narrow-band, wavelength division multiplexer or demultiplexer (NBWDM), with reference to FIG. 1. Typically a diffraction-grating-based, narrow-band, wavelength division multiplexer or demultiplexer (NBWDM) comprises a diffraction grating aligned with the ends of input and output waveguides serving several channels, typically 32 or more.

According to the conventional process, a wafer typically of silicon or silica having an optically smooth surface, and typically 1 mm thick, is used as the substrate for fabrication of optical components. As illustrated in FIG. 1A, a layer 20 of silica is deposited on the substrate 10, for example by flame hydrolysis deposition, or chemical deposition processes or plasma deposition processes, etc. Germanium, titanium or the like is used to dope the silica in order to raise the refractive index thereof. (In the case where a silicon substrate is used, a buffer layer is provided on the substrate 10 before deposition of the doped silica core layer 20, for the purposes of optical isolation. The buffer layer can be obtained by thermal oxidation.)

The silica layer 20 is typically between 5 and 10 $\mu$m thick, for example 6.5 $\mu$m thick. The cores 25 of the waveguides, as well as a planar waveguide 28, are formed from the layer 20 by patterning in a lithography step and subsequent etching to an appropriate depth, for example 7 $\mu$m in the case of using a core layer 6.5 $\mu$m thick (see FIG. 1B). Alignment marks for a later lithography step are formed during this first lithography step.

Next, an overclad layer 30 of undoped silica or of silica doped with, for example, boron or phosphorus, typically 10–20 $\mu$m thick is deposited by a suitable process, such as low pressure chemical vapour deposition (LPCVD), plasma enhanced chemical vapour deposition (PECVD), atmospheric pressure chemical vapour deposition (APCVD), flame hydrolysis, etc. (see FIG. 1C). Afterwards. the diffraction grating 35 is formed by patterning, during a lithography step where it is attempted to align the mask with the earlier-formed alignment marks. and etching the complete layer structure to a depth of between 20–30 $\mu$m (see FIG. 1D), typically by reactive ion etching. The grating-based, narrow-band, wavelength division multiplexer or demultiplexer (NBWDM) is completed by metallisation of the grating 35 by depositing a layer 36 of aluminium or gold (see FIG. 1E).

In the conventional process, numerous problems afflict the second lithography and etching steps. The substrate warps to a significant degree. typically around 100 $\mu$m for a 4" (100 mm) wafer, due to the thickness of the previously-deposited core and overclad layers (17–30 $\mu$m). This severe degree of warping makes it difficult to obtain a high resolution lithography, which is a serious drawback for the manufacture of narrow-band WDM components or the like where very precise definition of the etched components is required. In addition, good alignment of the masks used in the two lithography steps is required but this is rendered difficult by the loss of visibility which results from the great thickness of the overclad.

Moreover, in the conventional process, deep silica etching is required and this in itself is extremely difficult. Etching times are long, typically 5 to 10 hours, and there are severe constraints on the etching mask (high thickness, high etching resistance, low stress and high etching resolution). Furthermore, there is a loss of resolution during the etching resulting in rounding of the grating between 3 and 4 $\mu$m.

SUMMARY OF THE INVENTION

In view of the above problems, the present invention provides a new process for the fabrication of optical components, dispensing with the need to perform photolithography and etching steps on such a thick layered structure.

More particularly, the present invention provides a method of forming an optical component comprising at least one waveguide and at least one optical element disposed facing the end(s) of the waveguide or waveguides, comprising the step of depositing on a substrate a core layer for forming the core of the or each waveguide, characterised by further comprising the steps of: depositing a partial overclad layer on said core layer; patterning said core layer and partial overclad layer so as simultaneously to define the optical element(s) and the core(s) of the waveguide or waveguides; and depositing a further overclad layer.

By depositing the overclad layer in two stages and defining the optical element simultaneously with the waveguides by etching through the core layer and the partial overclad layer, the method of the present invention avoids the deep etching process present in the conventional fabrication method and enables high resolution definition of the optical element to be achieved.

Furthermore, by eliminating the second lithography step included in the conventional fabrication method, the present invention produces an important simplification of the process and ensures perfect alignment of the waveguide(s) with the optical element(s).

Also, by reducing the etching depth, the requirements on the etching mask are reduced, etching time is reduced and there is a further improvement in resolution (rounding of around 1 $\mu$m).

Preferably, the partial overclad layer should have a thickness in the range of 1–5 μm, the precise value being determined as a function of the difference which exists between the refractive indices of the core and overclad layers. For example, a partial overclad layer of 2–3 μm thickness is suitable in the case where waveguides having a relative difference between the refractive indices of the core layer (e.g. n=1.46) and the overclad layer (e.g. n=1.45) of 0.69% are used.

If the thickness of the partial overclad layer is too low, then in the resulting optical component, the optical element(s) facing the end of the waveguide(s) will oppose the waveguide cores and a small portion of overclad just above (which corresponds to the partial overclad layer) and will only handle light transmitted in these elements. However, in practice, light does not remain confined in the waveguide cores but will also propagate in the overclad layer during use, according to a Gaussian distribution. The extent of this propagation outside the core layer increases as the difference between the refractive indices of the core and overclad layers become closer or decreases.

Thus, to minimise optical losses, it is desirable that the optical component(s) should oppose not only the waveguide cores but also a portion of the overclad sufficiently thick to ensure that the majority of the light propagating outside the core layer is located in this portion of the overclad layer. Because the optical elements are formed by etching the partial overclad layer, and face the portion of the overclad layer which corresponds to the partial overclad layer, it is thus necessary that the partial overclad layer should have a thickness such that the majority of the light propagating outside the core layer is locate in the partial overclad layer.

On the other hand, if the partial overclad layer is made too thick, then the advantages of the present invention (better resolution, less warping) begin to be lost.

By performing the etching step through the core layer and a partial overclad layer 1–5 μm thick, good efficiency of the resulting optical component is maintained.

The present invention further provides an optical component comprising: at least one waveguide, and a grating formed by etching and disposed facing the end(s) of the waveguide or waveguides, wherein the core(s) of the waveguide(s) is or are made of silica, preferably doped silica, and the rounding of the grating due to etching is <3 μm and, preferably, is approximately equal to or less than 1 μm.

Further features and advantages of the present invention will become apparent from the following description of the preferred embodiments thereof, given by way of example, and illustrated in the accompanying drawings, in which:

DETAILED DESCRIPTION

In the following description, the method according to the present invention is illustrated by discussing two embodiments in which a NBWDM element is fabricated.

However, it is to be understood that the present invention is not limited to the manufacture of elements of this type but can be applied, generally, in situations where conventionally an optical element would have been formed in alignment with one or more waveguides by etching of the completed waveguide structure.

The first preferred embodiment of the method according to the invention will now be described referring to FIGS. 2A to 2E.

The first step of the method according to the first embodiment is the same as in the conventional method, and consists in the deposition of a doped silica layer 20 on a substrate 10 (see FIG. 2A) by any suitable technique. Typically, as in the example of FIG. 1, the substrate may be a silica substrate 1 mm thick and 100 mm in diameter and the core layer 20 can be silica doped with germanium, titanium or the like, 6.5 μm thick. The subsequent steps are different from those of the conventional method.

Next, instead of patterning and etching the waveguide cores and, afterwards, depositing the conventional overclad layer, in the present embodiment a partial overclad layer 30A between approximately 1 and 5 μm thick is deposited by one of the suitable processes, for example APCVD, PECVD, LPCVD, flame hydrolysis, etc. (see FIG. 2B). The partial overclad layer may be made of conventional materials, typically silica doped with boron or phosphorus. Next, waveguide cores 25' and a diffraction grating 35' are patterned simultaneously in a photolithography step and etched, for example, by reactive ion etching, typically to a depth of around 10 μm. (see FIG. 2C). The simultaneous etching of the grating 35' with the waveguide cores 25' ensures perfect alignment between them. Moreover, the patterning and etching of the grating 35' at this stage, through a relatively thin layered structure, ensures improved resolution and simplifies the etching process.

In the first preferred embodiment of the invention, the grating is next metallised by deposition of a metallic layer 36, for example by evaporation under vacuum or sputtering. (see FIG. 2D). The metallisation is performed in a directional manner so that the metal layer 36 forms on the grating 35' and not (or scarcely) on the other surfaces. After this, a further overclad portion 30B is deposited in order to complete the overclad portion of the waveguides (see FIG. 2E). Since the overclad layer 30B is deposited after the metallisation step, a low-temperature overclad deposition process (typically<900° C.) should be chosen, such as PECVD, LPCVD or a sol-gel process. For the metallisation of the grating a metal having a high melting point is preferred, such as gold.

The second preferred embodiment of the invention will next be described with reference to FIGS. 3A to 3F.

Figure 1A:
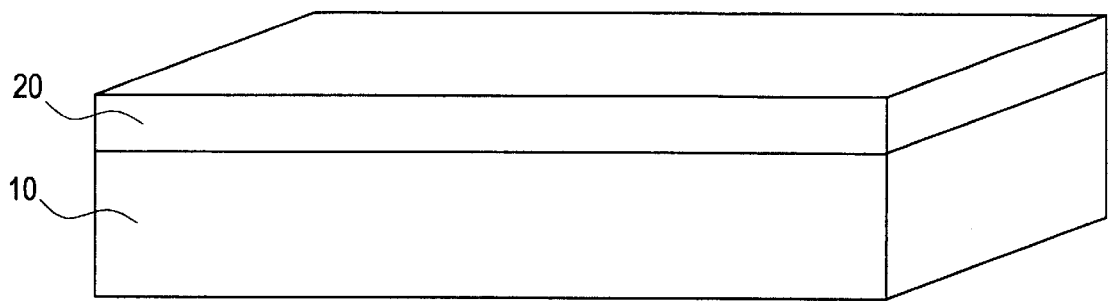
FIG. 1 illustrates a conventional process for manufacturing a NBWDM element, the process passing through intermediate steps illustrated diagramatically in FIGS. 1A to 1E.
Figure 1B:
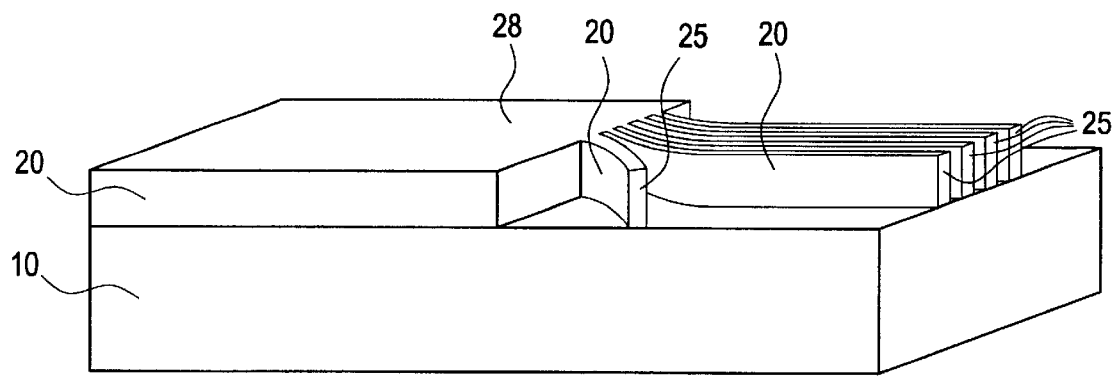
Figure 1C:
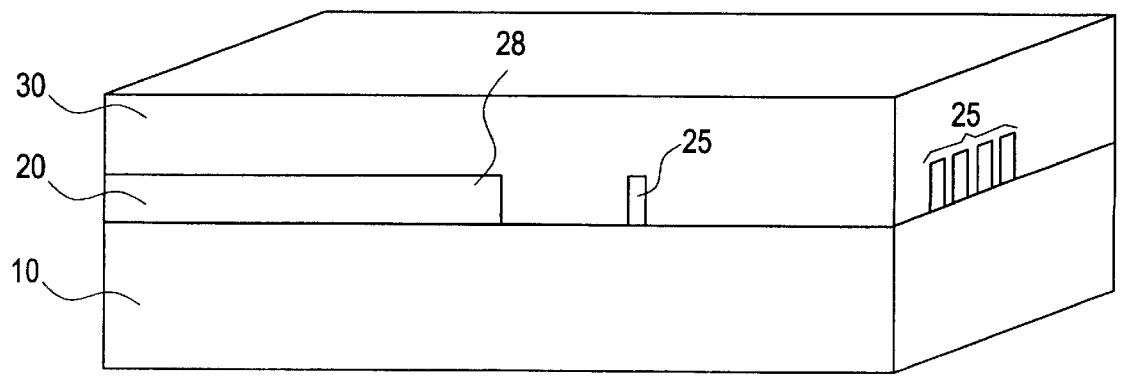
Figure 1D:
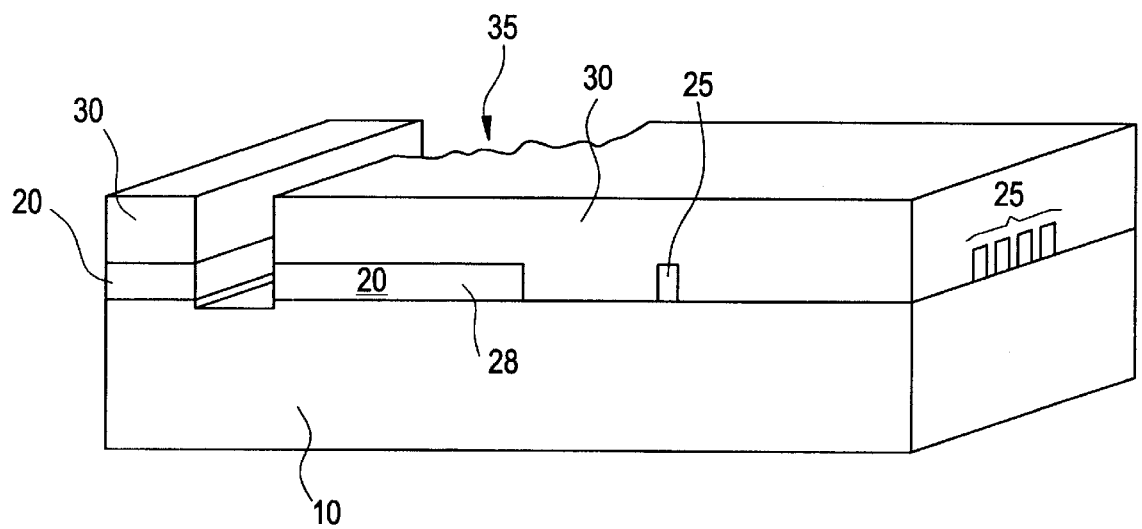
Figure 1E:
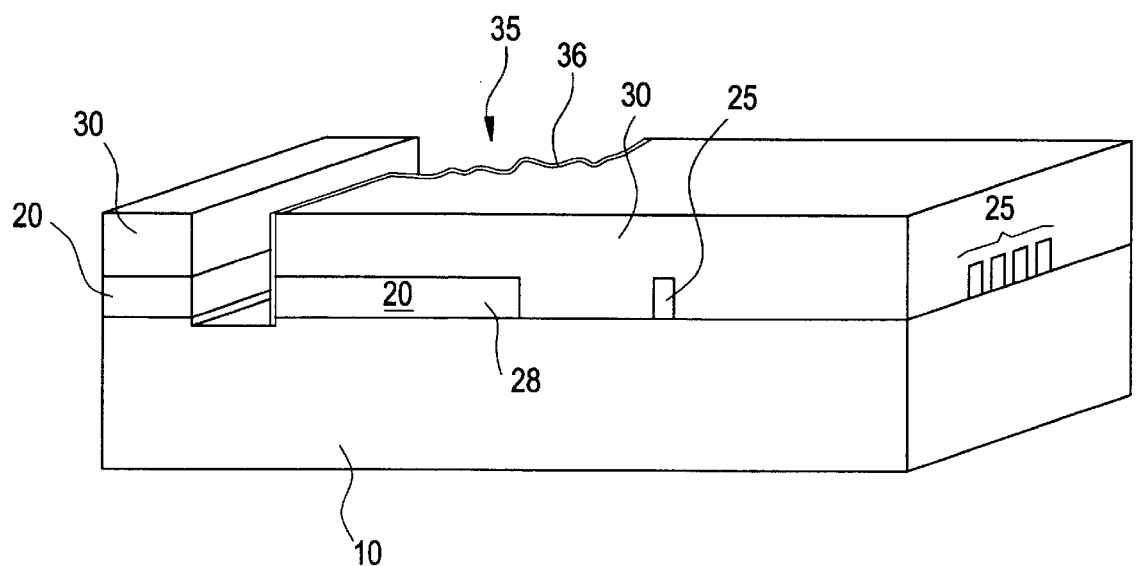
Figure 2A:
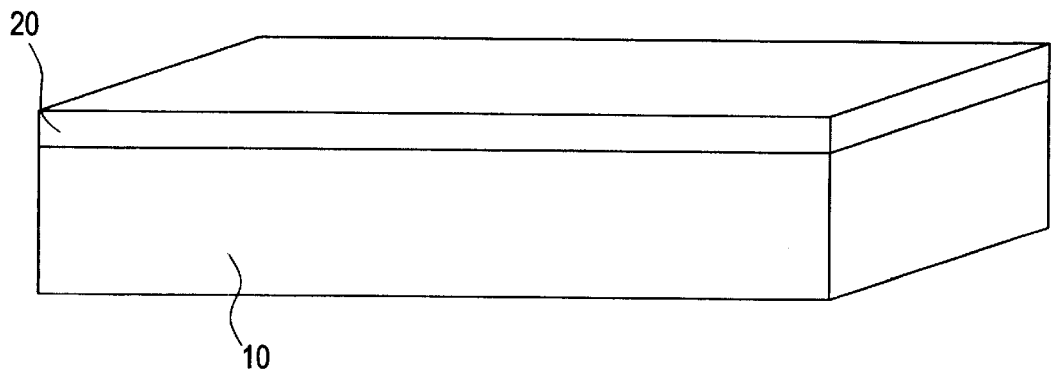
FIG. 2 illustrate a first preferred embodiment of the fabrication process according to the present invention applied to the manufacture of a NBWDM element and passing through intermediate stages illustrated diagramatically in FIGS. 2A to 2E.
Figure 2B:
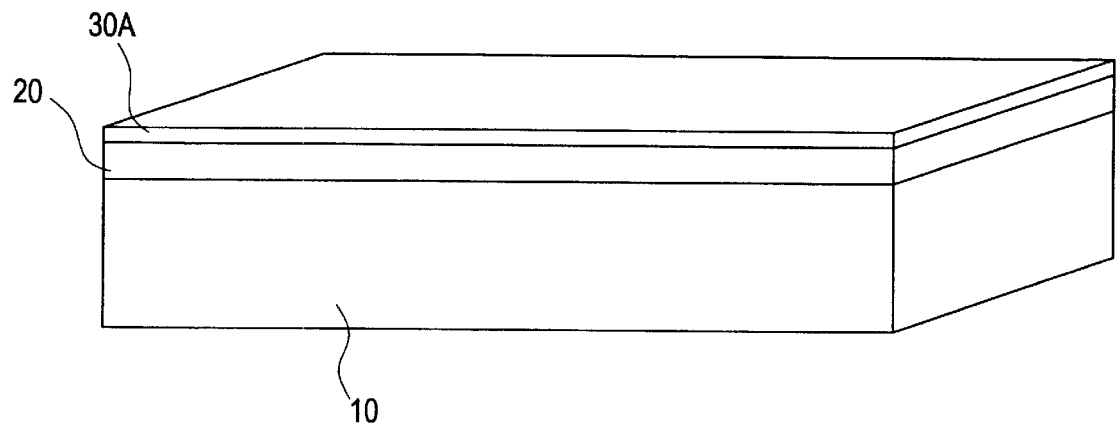
Figure 3A:
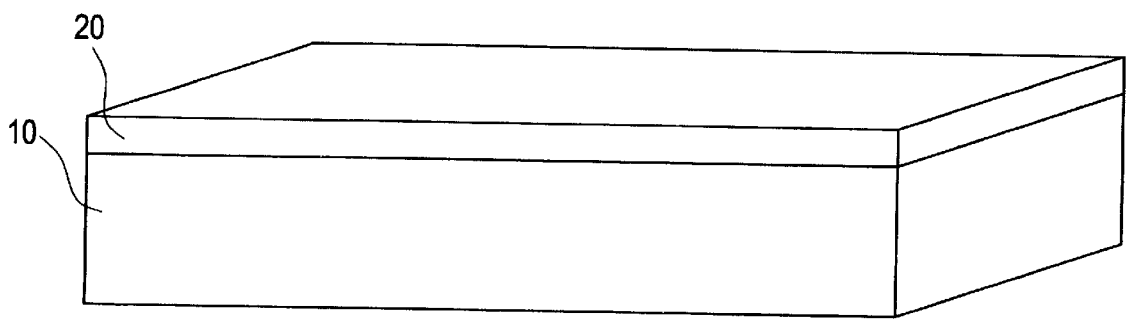
FIG. 3 illustrates a second preferred embodiment of the fabrication process according to the present invention applied to the manufacture of a NBWDM element and passing through intermediate stages illustrated diagramatically in FIGS. 3A to 3F.
Figure 3B:
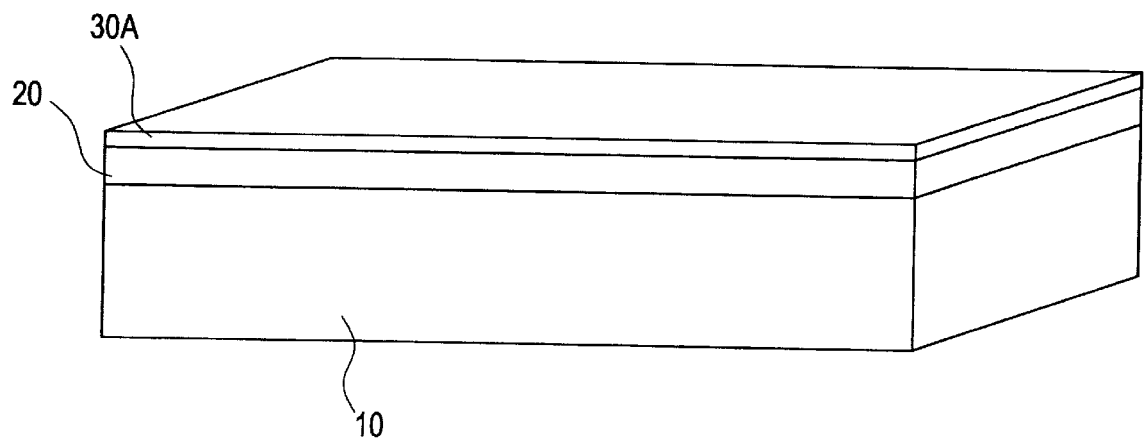
Figure 3C:
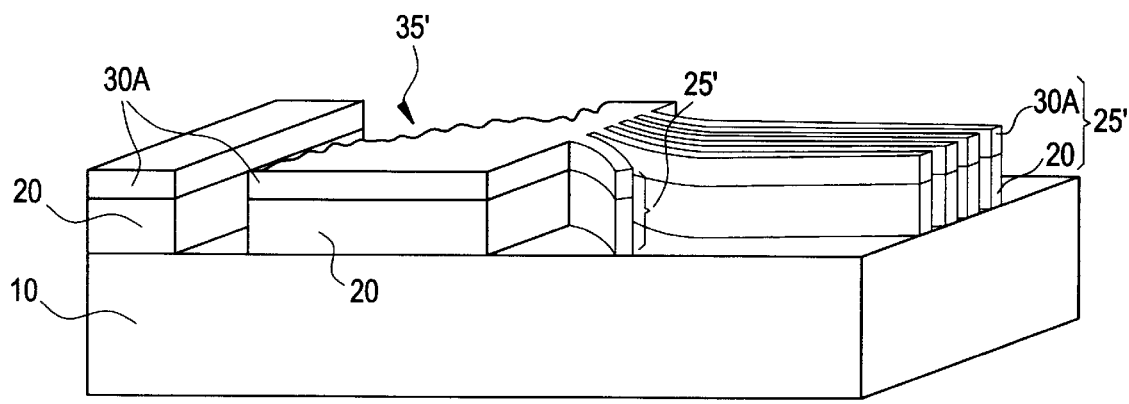
Figure 3D:
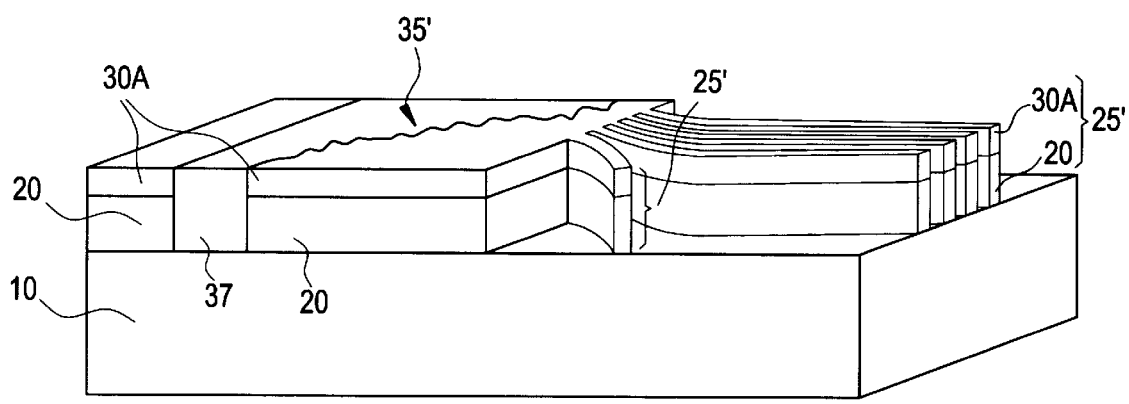
Figure 3E:
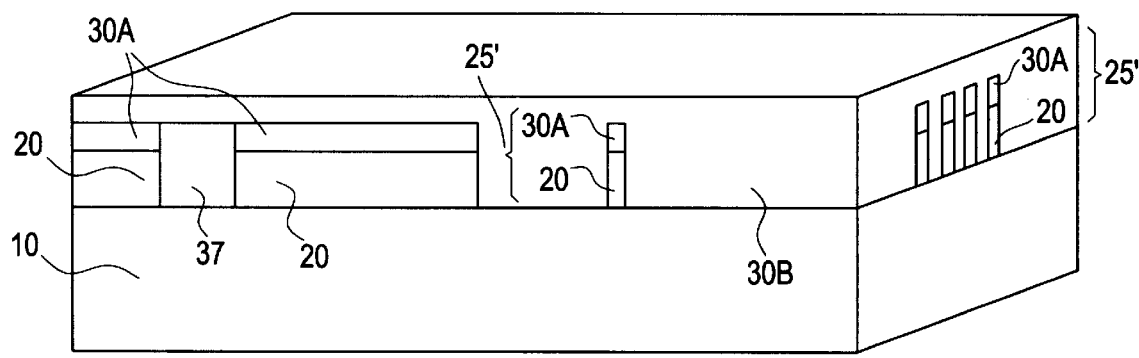
Figure 3F:
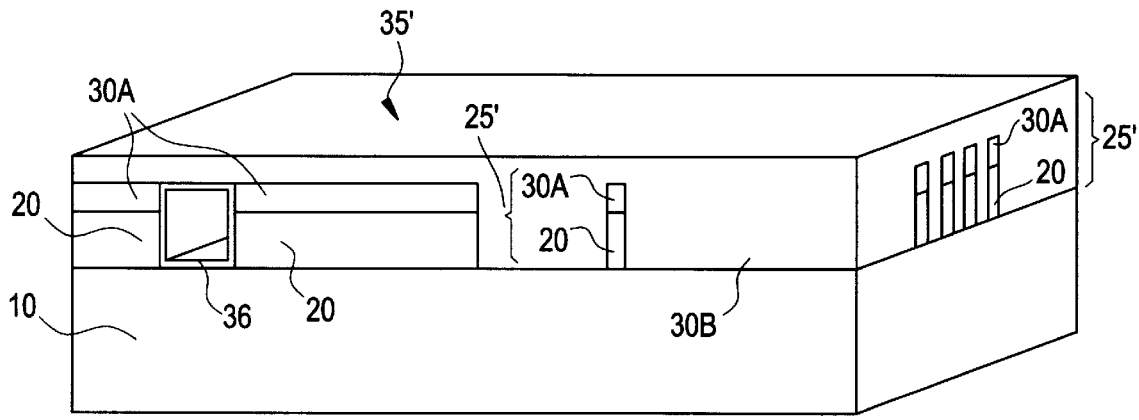

The first three steps of the method according to the second embodiment are the same as those of the first embodiment. and consist in the deposition of a doped silica layer 20 on a silica substrate 10 (see FIG. 3A), followed by the deposition of a partial overclad layer 30A (see FIG. 3B) and the simultaneous patterning and etching of a grating 35' and the waveguide cores 25' (see FIG. 3C). However, the process differs in the subsequent steps.

According to the second embodiment, the metallisation of the grating 35' is deferred. Instead. a protective layer 37, preferably a high-temperature-resistant polymer such as polyimide, is deposited on the grating (see FIG. 3D) and then the overclad layer 30B is deposited (see FIG. 3E). The protective layer is generally formed by coating a precursor product in liquid form on the grating and then polymerising it at high temperature. As in the first embodiment, a low temperature deposition process is required for depositing the overclad layer 30B; but in this case, temperatures<500° C. are required. After the overclad layer 30B is deposited, the protective layer 37 is removed and the grating 35' is metallised, typically by sputtering or evaporation in a vacuum to deposit a layer 36 of aluminium or gold (see FIG. 3F). This time, because of the presence of the layer 30B above the grating 35', it is no longer possible to perform the metallisation in a manner which ensures that the metal deposits only on the grating 35'. However, the presence of a metal layer 36 on the other surfaces of the cavity behind the grating 35' does not produce any ill effects.

It will be seen that, in both of the above-described embodiments, the lithography is performed on a substrate having only a partial overclad layer covering the core layer. Thus, the resolution of the lithography is improved. For example, in the case of forming an optical component on a 100 mm wafer, as in the above-described example, warping of the wafer affecting the lithography step is reduced to around 30 μm. Moreover, the simultaneous definition of the diffraction grating and the waveguide cores ensures perfect alignment and eliminates a lithography step. Finally, by reducing the etching depth required during the definition of the grating, the etching process becomes simpler, quicker to accomplish and has better resolution.

In the above description, detailed operating conditions have not been given for the various deposition processes, flame hydrolysis, APCVD, LPCVD, PECVD, sol-gel, etc. in view of the fact that these processes are well-known in this field. For example, details of many of these processes can be found in the first two sections of the invited review paper CR53-03 "Glass Integrated Optics and Optical Fiber Devices" by Michael F. Grant presented at the critical review conference CR53, SPIE 1994, San Diego. July 1994.

Although the present invention has been described with reference to particular embodiments thereof, it is to be understood that the present invention is not limited to the detailed characteristics of these embodiments. More particularly, numerous modifications and adaptations thereof will readily occur to persons skilled in the art.

For example, the method of the present invention can be applied in order to make optical components where one or more waveguides are aligned with an optical element other than a grating, such as, for example, a lens, a focusing or reflecting mirror, a prism, etc.

Furthermore, although in the above-described embodiments the core layer 20 was formed directly on the substrate 10, it is to be understood that the present invention applies also in cases where the nature of the substrate and the core material makes it necessary to provide a buffer layer.

Furthermore, although the above-described embodiments concern optical components in which the waveguides are silica based, the method according to the present invention can also be applied in the fabrication of optical components in which the waveguides are based on semi-conductors such as InP (indium phosphide). Having a refractive index higher than that of silica, indium phosphide enables the creation of thinner core and overclad layers and, thus, the completed waveguide structure is thinner that of a silica-based waveguide. Nevertheless, the fabrication method provided by the invention presents advantages compared with the conventional method even in the case of fabrication of InP-based optical components. Notably, there is an improvement in etching resolution and a simplification of the fabrication process.

Moreover, although the supplementary overclad layer (30B) formed in the above-described embodiments is made of silica, it can be constituted by another material, such as, for example, a polymer. The above and other modifications and adaptations that will readily occur to the skilled person are included within the scope of the present invention as defined in the appended claims.

What is claimed is:

1. A method for making an optical component having at least one waveguide defining a core, an end, and at least one optical element disposed facing the end of the waveguide, the waveguide being fabricated from a substrate and a core layer deposited on the substrate to form the core, the method comprising the steps of:

depositing a partial overclad layer on the core layer;

patterning the core layer and the partial overclad layer so as to simultaneously define the optical element and the core of the waveguide, the optical element including a diffraction grating;

metallizing the diffraction grating; and depositing a further overclad layer on the partial overclad layer wherein the patterning step is performed using a reactive ion etching process.

2. The method of claim 1 wherein the partial overclad layer has a thickness in the range of 1 μm to 5 μm.

3. The method of claim 2 wherein the partial overclad layer has a thickness of 2 μm to 3 μm, and further wherein the core and the partial overclad layer each have a refractive index such that a relative difference of approximately 0.7% exists between the refractive index of the core and the refractive index of the partial overclad layer.

4. The method of claim 2 wherein the core and the further overclad layer each have a refractive index such that a relative difference of approximately 0.7% exists between the refractive index of the core and the refractive index of the further overclad layer.

5. The method of claim 1 wherein the step of metallizing the grating takes place before the step of depositing the further overclad layer, and the step of depositing the further overclad layer takes place at a temperature below 900° C.

6. The method of claim 1 wherein the step of depositing the further overclad layer takes place before the step of metallizing the grating, the grating being protected by a high temperature resistant polymer applied thereto, the step of depositing the further overclad layer taking place at a temperature below 500° C., and the high temperature resistant polymer is removed from the grating before the step of metallizing the grating.

7. The method of claim 1 wherein the step of depositing the further overclad layer is performed by a process taking place at low temperatures selected from a group consisting of APCVD, PECVD, LPCVD and the sol-gel process.

8. The method of claim 1 wherein the step of metallizing the grating is performed using gold.

9. The method of claim 1 wherein the optical component is a wavelength division multiplexer/demultiplexer.

10. The method of claim 9 wherein the optical component is a narrow-band wavelength division multiplexer/demultiplexer defining at least 32 channels.

11. The method of claim 1 wherein the core layer includes a silica material.

12. The method of claim 1 wherein the core layer and the partial overclad layer include a semiconductor material.

13. A method for making an optical component having at least one channel waveguide, the channel waveguide having an end; a planar slab waveguide coupled to the end of the channel waveguide; and an optical element coupled to the planar slab waveguide, the optical element disposed facing the end of the channel waveguide, the component being fabricated from a substrate and a core layer deposited on the substrate to form the core, the method comprising the steps of:

depositing a partial overclad layer on the core layer;

patterning the core layer and the partial overclad layer so as to simultaneously define the channel waveguide, the planar slab waveguide, and the optical element, the optical element including a diffraction grating;

metallizing the grating; and depositing a further overclad layer on the partial overclad layer, wherein the patterning step is performed using a reactive ion etching process.

14. The method of claim 13 wherein the core layer and the partial overclad layer include a semiconductor material.

15. The method of claim 13 wherein the core layer and the partial overclad layer include a silica material.

16. The method of claim 13 wherein the step of metallizing the grating takes place before the step of depositing the further overclad layer, and the step of depositing the further overclad layer takes place at a temperature below 900° C.

17. The method of claim 13 wherein the partial overclad layer has a thickness in the range of 1 $\mu$m to 5 $\mu$m.

* * * * *